July 26, 1938.  H. F. NELSON  2,125,170

BICYCLE LOCK

Filed Oct. 30, 1936

INVENTOR
Henry F. Nelson,
BY Minturn & Minturn
ATTORNEYS

Patented July 26, 1938

2,125,170

UNITED STATES PATENT OFFICE 2,125,170

BICYCLE LOCK

Henry F. Nelson, Danville, Ill.

Application October 30, 1936, Serial No. 108,328

6 Claims. (Cl. 70—227)

This invention relates to locks and particularly to a lock for use on bicycles and the like. A primary object of the invention is to provide a simple locking device which may be attached to a member of the bicycle such as one of the wheel fork members in such a manner that a member from the lock may be swung over to grip about a spoke or air valve of the wheel. It is a further important object of the invention to provide such a device that may be quickly applied and at the same time prevent theft of the lock device itself after installation. A still further important object of the invention is to provide an extremely simple structure which may be constructed and assembled at a minimum cost, and which may have a minimum number of parts.

Figure 1:
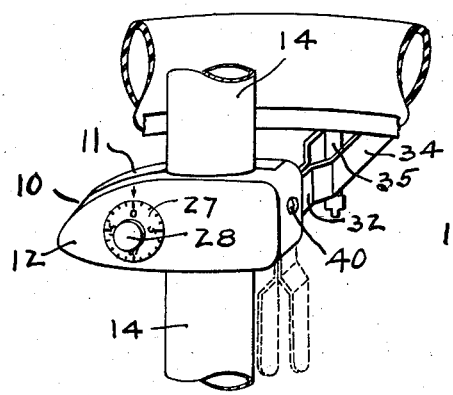
Figure 2:
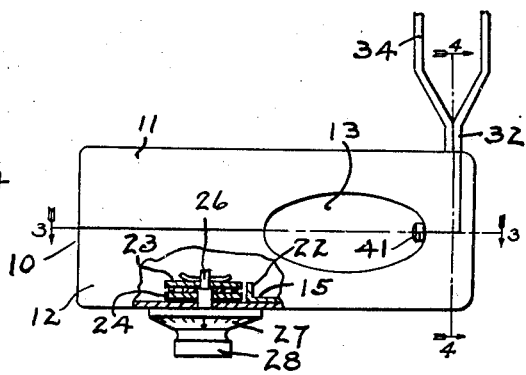
Figure 3:
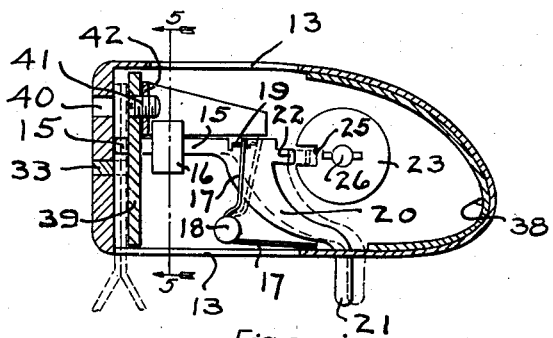
Figure 4:
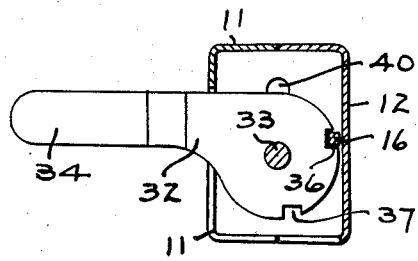
Figure 5:
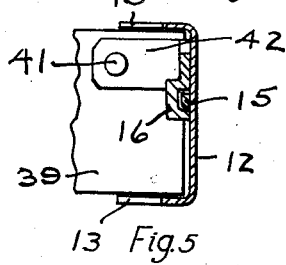

These and many other objects and advantages of the invention will become apparent to those versed in the art in the following description of one particular form of the invention as illustrated in the accompanying drawing, in which Fig. 1 is a side view in perspective of a lock embodying my invention;

Fig. 2, a top plan view on an enlarged scale;

Fig. 3, a vertical longitudinal section on the line 3—3 in Fig. 2;

Fig. 4, a vertical transverse section on the line 4—4 in Fig. 2;

Fig. 5, a vertical transverse section on the line 5—5 in Fig. 3; and

Figure 6:
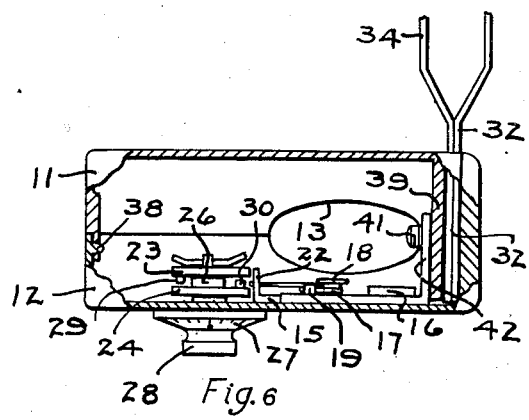

Fig. 6, a top plan view of the lock in partial section.

Like characters of reference indicate like parts throughout the several views in the drawing.

I form a two-part housing, generally designated by the numeral 10, having an inner section 11 and an outer section 12. When the two sections 11 and 12 are placed one against the other, they form the completed housing 10 and each section is cut away in its top and bottom walls to provide an opening 13 through the housing, the contour of which opening 13 conforms to the periphery of the fork member 14 to which the lock is to be applied.

The section 12 of the housing carries a slide member 15 horizontally slidable through a guide 16 carried on the wall of the housing section 12. A spring 17 fulcrumed about a pin 18, Fig. 3, bears by one end against a lug 19 normally urging the slide 15 toward an outer position. A leg 20 extends from the slide 15 and out through a side wall of the housing section 12 to terminate in an external finger 21. The opening through the housing section 12 through which the finger 21 extends is slotted so that by pulling rearwardly on the finger 21, the slide 15 may likewise be shifted in opposition to the spring 17 as indicated by the dash lines, Fig. 3.

This backward travel of the slide 15 is limited. In the path of a lug 22 extending from the slide 15 are carried a plurality of disks, here shown as two in number, indicated by the numerals 23 and 24. Each of these disks is provided with a notch or slot 25 cut in its periphery of such size and shape that when suitably presented toward the member 22, that member may enter the slot 25 when the finger 21 is retracted as indicated in Fig. 3. However, since there are at least two of the disks in the path of the member 22, these slots must register to permit the rearward travel of the member 22. In order to accomplish this result, the disk 23 is fixed on a shaft 26 which revolubly extends through the side of the housing section 12 and carries externally thereof a dial 27. A knob 28 on the dial is employed as a means of revolving the shaft 26. The other disk 24 may be revolved independently of the shaft 26 although mounted thereon. The disks 23 and 24 each carry respectively a pin 29 and 30 projecting one toward the other plate, Fig. 6. These pins 29 and 30 are mounted equi-distant from the axis of the shaft 26. Therefore when the knob 28 is turned and the disk 23 is turned accordingly, the pin 29 will be carried around to strike the pin 30 and then cause the disk 24 to be revolved along with the disk 25. By thus turning the disk 24, the notch in that disk may be brought around to the proper position to receive the member 22 and then subsequently the disk 23 may be turned backwardly until the notch in it is likewise positioned to receive that member 22. By shifting the position of the disk 23 around the shaft 26, the notch therein may of course be positioned to correspond to any suitable indicating means on the dial 27 so that when the proper combination is achieved by turning the dial 27, the finger 21 may be retracted to withdraw the slide 15 from a latching position.

Hinged on the inside of the forward wall of the housing section 12 is a latch member 32, the member being hinged by any suitable means such as a pin 33. This member 32 has a bifurcated end 34 which may be swung in a plane transversely to the housing 10, Fig. 1, so as to straddle any suitable member such as a valve stem 35. In order to retain the latch member 32 in that position, a notch 36 is formed in the heel of the member 32 so as to receive the forward end of the slide 15 and thereby prevent rotation of the member 32. Before the member 32 may be dropped to release the member 35, the slide 15 must be withdrawn in the manner above indicated.

In order to retain the member 32 in the unlatched position, dash line position, Fig. 1, a second notch 37 is provided in the heel of the member 32 ninety degrees from notch 36 which will likewise receive the slide member 15 thereacross when the member 32 is swung downwardly.

Now in order to mount the housing 10 on the fork member 14 and secure it against theft or unwarranted removal therefrom, the two sections 11 and 12 are so formed as to be fitted one to the other and be secured by some means normally covered over by the latch member 32 when that member is in a position restrained against movement by the slide 15. In the particular form herein shown, the housing section 12 is provided with a tongue 38 extending inwardly from the rear wall to pass through a hole provided in a portion of the housing section 11 extending inwardly thereover, Fig. 6. The forward end of the housing section 11 carries an inturned leg 39 which passes into the housing section 12 alongside of the latch member 32, Figs. 3, 5 and 6.

Through the forward end of the housing section 12, which end extends across transversely over the forward portion of the housing section 11, is a hole 40 normally covered over from the inside in part, if not entirely, by the latch member 32. When the latch member 32 is turned to have the notch 36 register with the hole 40, a screw 41 may be entered through the hole 40, screwthreadedly engaged in the leg 39 to extend therethrough into a hole of a bracket 42 carried by the housing section 12. Thus by this screw 41, the two housing sections are secured one to the other. Moreover the length of the screw 41 is made to be such that it may extend inwardly a sufficient distance to abut the fork member 14 and thereby prevent shifting of the housing 10 along the member 14. Thus it is to be seen that when the latch member 32 is in the locked position as in Fig. 1, solid lines, access to the screw 41 may not be had and therefore the housing 10 can not be shifted or removed.

While I have herein shown and described my invention in the one best form as now known to me, it is obvious that structural changes may be made without departing from the spirit of the invention, and I, therefore, do not desire to be limited to that precise form beyond the limitations as may be imposed by the following claims.

I claim:

1. In a bicycle lock for attachment to a member adjacent a wheel thereof, a two-part housing, a member swingably carried by the housing to swing into and out of the path of the wheel, lock means carried by the housing normally retaining the swinging member in the wheel path, and a screw in the housing abutting said first member and concealed by said swinging member when in the wheel path and securing the two parts of the housing together.

2. In a bicycle lock for attachment to a member adjacent a wheel thereof, said lock having a two part housing and having a member swingably carried by the housing to swing into and out of the path of the wheel, and having lock means carried by the housing normally retaining the swinging member in the wheel path, means uniting the two parts of the housing and engaging said housing with said first member and concealed by said swinging member when in the wheel path, said swinging member having a segmental heel with two notches ninety degrees apart and said lock means comprising a slide successively engaging in said notches to lock the swinging member in respective horizontal and vertical positions.

3. In a bicycle lock for attachment to a member adjacent a wheel thereof, a housing, a member swingably carried by the housing to swing into and out of the path of the wheel, lock means carried by the housing normally retaining the swinging member in the wheel path, and a screw in the housing abutting said first member and concealed by said swinging member when in the wheel path, said housing being in two parts to facilitate mounting on said member without demounting said wheel, and said engaging means securing said housing parts one to the other.

4. In a bicycle lock for engaging a wheel, a housing formed to engage a wheel fork, said housing being in two separable parts for assembly on the fork, a set screw having a head and uniting the two parts of the housing and contacting the fork to retain the housing in position, a wheel engaging member swingably carried by the housing to swing into the path of the wheel to engage a member thereof such as a valve stem and to cover the head of the set screw, a spring urged slide carried by the housing and normally extending into the path of the swinging member inside of the housing, said swinging member carrying a recess located to receive said slide when the member is rocked into the wheel path whereby the member is then held against rocking, and a second recess to receive the slide and lock the member when it is rocked out of the wheel path, and lock means carried by the housing controlling shifting of said slide.

5. In a bicycle lock for engaging a wheel, a housing formed to engage a wheel fork, said housing being in two separable parts for assembly on the fork, a set screw having a head and uniting the two parts of the housing and contacting the fork to retain the housing in position, a wheel engaging member swingably carried by the housing to swing into the path of the wheel to engage a member thereof such as a valve stem and to cover the head of the set screw, a spring urged slide carried by the housing and normally extending into the path of the swinging member inside of the housing, said swinging member carrying a recess located to receive said slide when the member is rocked into the wheel path whereby the member is then held against rocking, and a second recess to receive the slide and lock the member when it is rocked out of the wheel path, and lock means carried by the housing controlling shifting of said slide, said slide having a portion presented for operation externally of said housing following release by said lock means.

6. In a bicycle lock for engaging a wheel, a housing in two separable parts for assembly together about a fork of the bicycle, a set screw having a head and uniting the two parts of the housing and contacting said fork to retain the assembled housing in fixed position on the fork, a wheel engaging member carried from inside of the housing to swing into the path of the wheel to engage a member thereof such as a valve stem and to cover said head of the set screw, a spring urged slide carried by the housing and normally extending into the path of the swinging member inside of the housing, said swinging member carrying a recess located to receive said slide when the member is rocked into the wheel path whereby the member is then held against rocking, said swinging member having a second recess to receive the slide and thereby prevent rocking when out of said wheel path, and lock means carried by the housing controlling shifting of said slide.

HENRY F. NELSON.